United States Patent
Szymczak et al.

(10) Patent No.: US 10,024,354 B2
(45) Date of Patent: Jul. 17, 2018

(54) PROTECTION CAP ASSEMBLY FOR ONE OR MORE BOLTS

(71) Applicants: David Szymczak, Westfield, IN (US); Brian Mula, Kokomo, IN (US)

(72) Inventors: David Szymczak, Westfield, IN (US); Brian Mula, Kokomo, IN (US)

( * ) Notice: Subject to any disclaimer, the term of this patent is extended or adjusted under 35 U.S.C. 154(b) by 108 days.

(21) Appl. No.: 15/370,130

(22) Filed: Dec. 6, 2016

(65) Prior Publication Data
US 2018/0156260 A1 Jun. 7, 2018

(51) Int. Cl.
*F16B 37/14* (2006.01)
*E03D 11/16* (2006.01)

(52) U.S. Cl.
CPC ............ *F16B 37/14* (2013.01); *E03D 11/16* (2013.01)

(58) Field of Classification Search
CPC ......... F16B 37/14; F16B 37/145; E03D 11/16
USPC .................... 411/372.5, 372.6, 373
See application file for complete search history.

(56) References Cited

U.S. PATENT DOCUMENTS

| | | | | |
|---|---|---|---|---|
| 3,241,427 A | * | 3/1966 | Bosler | F16B 37/14 4/252.1 |
| 3,548,704 A | * | 12/1970 | Kutryk | F16B 37/14 411/373 |
| 3,854,371 A | * | 12/1974 | Lamothe | F16B 37/14 138/96 T |
| 5,590,992 A | * | 1/1997 | Russell | B60B 7/14 301/37.374 |
| D527,810 S | * | 9/2006 | Frazer | D23/309 |
| 7,624,759 B1 | * | 12/2009 | Ismert | E03C 1/22 138/89 |
| 7,854,337 B1 | * | 12/2010 | Ismert | E03B 7/003 174/666 |
| 9,663,934 B2 | * | 5/2017 | Duncan | E03D 11/16 |

* cited by examiner

*Primary Examiner* — Roberta S Delisle
(74) *Attorney, Agent, or Firm* — Ritchison Law Offices, PC; John D Ritchison

(57) ABSTRACT

A protection cap assembly for fastener assembly for protecting bolts in various places. The protection cap assembly includes: (i) a clipping ring, (ii) a gripping shaft, and (iii) a cap. The clipping ring is made from plastic. The gripping shaft holds the clipping ring. The gripping shaft includes (i) a pair of set screws (ii) a first channel, (iii) a second channel, (iv) a first set of one or more fins, and (v) a second set of one or more fins. The pair of set screws engages with the nut. The first channel holds the clipping ring. The first set of one or more fins and the second set of one or more fins are arranged inside the gripping shaft. The gripping shaft further includes a big inlet to accommodate a big sized bolt and a small inlet to accommodate a small sized bolt. The cap is adapted to telescope on the gripping shaft. The gripping shaft is made from plastic. The cap encloses the gripping shaft. The cap includes a hole that encloses the gripping shaft. The cap is made from a plastic.

15 Claims, 4 Drawing Sheets

PROTECTION CAP ASSEMBLY FOR ONE OR MORE BOLTS

BACKGROUND

Technical Field

The embodiments herein generally relate to a protection cap assembly particularly, a protection cap for protecting one or more bolts of a toilet.

Description of the Related Art

Fasteners devices have been used onto various surfaces to keep the substrates secure. Most of the fastening devices used, include without limiting, screw, bolt, rivet or the like. The bolts are the most commonly adapted fastening devices. The shank of the bolt, after being fastened, remains exposed. The shank of the bolt affects the aesthetics of the bolt. Already available tools allow these bolts to cut down. Cutting these exposed bolts is time consuming and requires heavy force. Also, the force needed to cut the bolt can damage the surface of the substrate.

Accordingly, there remains a need of a safe, easy to fit protection cap assembly for covering bolts exposed in various places.

SUMMARY

In view of the foregoing, an embodiment herein provides a protection cap assembly for a bolt to protect the bolt. The protection cap assembly includes (i) a clipping ring, (ii) a gripping shaft, and (iii) a cap. The gripping shaft is adapted to hold the clipping ring. The gripping shaft includes: (i) a pair of set screws (ii) a first channel, (iii) a second channel, (iv) a first set of one or more fins, and (v) a second set of one or more fins. The pair of set screws is adapted to engage with the bolt. The first channel and the second channel are adapted to hold the clipping ring and engage with the shank of the bolt.

The first set of one or more fins and the second set of one or more fins are arranged inside the gripping shaft. The gripping shaft includes a big inlet to accommodate a big sized bolt and a small inlet to accommodate a small sized bolt. The cap is adapted to enclose the gripping shaft. The cap includes a hole that is adapted to enclose the gripping shaft.

In one embodiment, the gripping shaft, the clipping ring, and the cap are made from a plastic or metal. In another embodiment, the gripping shaft includes a pair of set screws. In another embodiment, the gripping shaft, the clipping ring and the cap are made from acrylonitrile butadiene styrene. The cap is adapted to telescope on the gripping shaft.

In yet another aspect, an embodiment herein provides a protection cap assembly for a bolt to protect the bolt. The protection cap assembly includes (i) a clipping ring, (ii) a gripping shaft, and (iii) a cap. The first clipping ring is made from acrylonitrile butadiene styrene. The gripping shaft is adapted to hold the clipping ring. The gripping shaft includes: (i) a pair of set screws (ii) a first channel, (iii) a second channel, (iv) a first set of one or more fins, and (v) a second set of one or more fins. The gripping shaft is made from acrylonitrile butadiene styrene. The first channel and the second channel are adapted to hold the clipping ring. The first set of one or more fins and the second set of one or more fins are arranged inside the gripping shaft. The gripping shaft includes a big inlet to accommodate a big sized bolt and a small inlet to accommodate a small sized bolt. The cap is adapted to enclose the gripping shaft. The cap includes a hole that is adapted to enclose the gripping shaft. The cap is made from acrylonitrile butadiene styrene.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
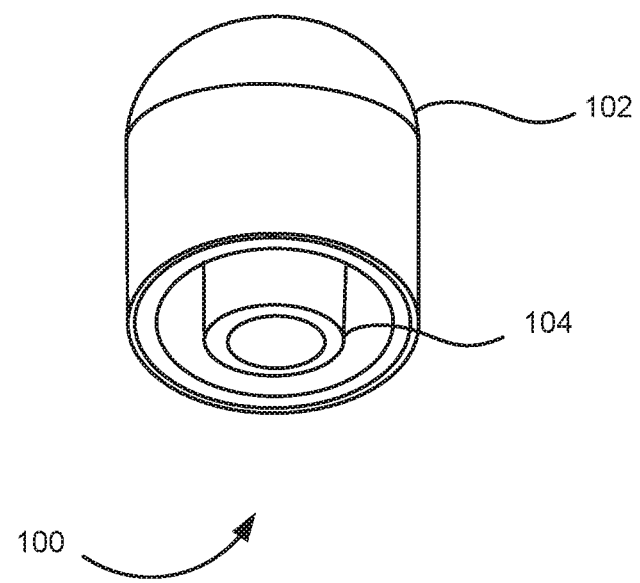
FIG. 1 is a diagrammatic representation of an assembly of a cap and a gripping shaft according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Accordingly, there remains a need of a safe, and an easy to fit protection cap assembly for one or more bolts exposed in various places. Referring now to the drawings, and more particularly to FIGS. 1 through 5, where similar reference characters denote corresponding features consistently throughout the figures, there are shown preferred embodiments.

FIG. 1 is a diagrammatic representation of an assembly 100 of a cap 102 and a gripping shaft 104 according to an embodiment herein. The assembly 100 includes the cap 102 and the gripping shaft 104. The cap 102 includes a hole (not shown in FIG. 1). The gripping shaft 104 fits into the hole inside the cap 102. In one embodiment, the cap 102 and the gripping shaft 104 are made from plastic. In another embodiment, the plastic may be acrylonitrile butadiene styrene.

Figure 2:
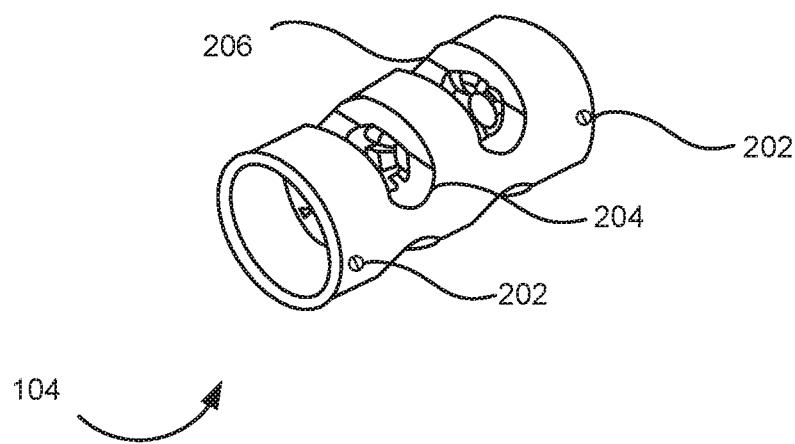
FIG. 2 is a diagrammatic representation of the gripping shaft of FIG. 1 according to an embodiment herein.

FIG. 2 is a diagrammatic representation of the gripping shaft 104 of FIG. 1 according to an embodiment herein. The gripping shaft 104 includes a pair of set screws 202, a first channel 204 and a second channel 206. The first channel 204 and the second channel 206 engage with a clipping ring (not shown in FIG. 2). The two set screws 202 are at both the extreme portions of the gripping shaft 104. In one embodiment, the first channel may engage a first clipping ring and the second channel may engage a second clipping ring.

Figures 2A, 2B:
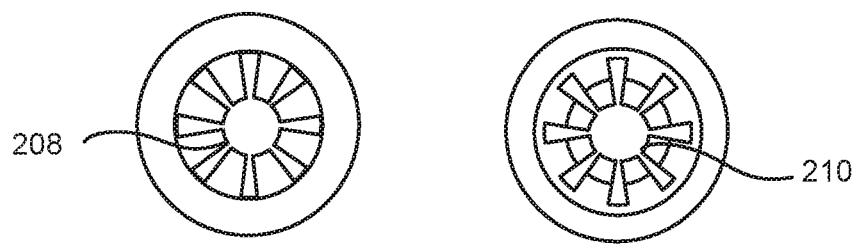
FIG. 2A is a diagrammatic representation of a bottom view of the gripping shaft of FIG. 1 according to an embodiment herein.
FIG. 2B is a diagrammatic representation of a top view of the gripping shaft of FIG. 1 according to an embodiment herein.

FIG. 2A is a diagrammatic representation of a bottom view of the gripping shaft 104 of FIG. 1 according to an embodiment herein. The bottom view of the gripping shaft 104 includes a small inlet. The small inlet of the gripping shaft 104 includes a first set of one or more fins 208. The first set of one or more fins 208 improves the holding power of the gripping shaft 104 over the shank of the bolt (not shown in FIG. 2A). In one embodiment, the small inlet of gripping shaft 104 accommodates a small sized bolt.

FIG. 2B is a diagrammatic representation of a top view of the gripping shaft 104 of FIG. 1 according to an embodiment herein. The top view of the gripping shaft 104 includes a big inlet. The big inlet of the gripping shaft 104 includes a second set of one or more fins 210. The second set of one or more fins 210 improves the holding power of the gripping shaft 104 over the shank of the bolt (Not shown in FIG. 2A). In one embodiment, the big inlet of gripping shaft 104 accommodates a big sized bolt.

In another embodiment, the gripping shaft 104 is made from acrylonitrile butadiene styrene.

Figure 3:
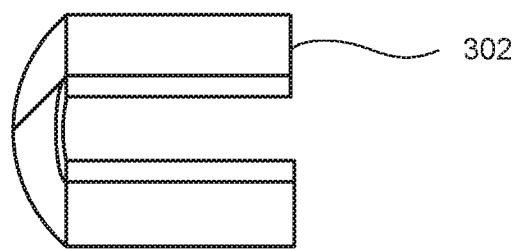
FIG. 3 is a diagrammatic representation of the clipping ring according to an embodiment herein.

FIG. 3 is a diagrammatic representation of the clipping ring 302 according to an embodiment herein. The clipping ring 302 engages with the first channel 204 and the second channel 304 of the gripping shaft 104. In one embodiment, the clipping ring 302 is made from a material selected from plastic, or the like. The clipping ring 302 may hold a big bolt as well as a small bolt.

Figure 4:
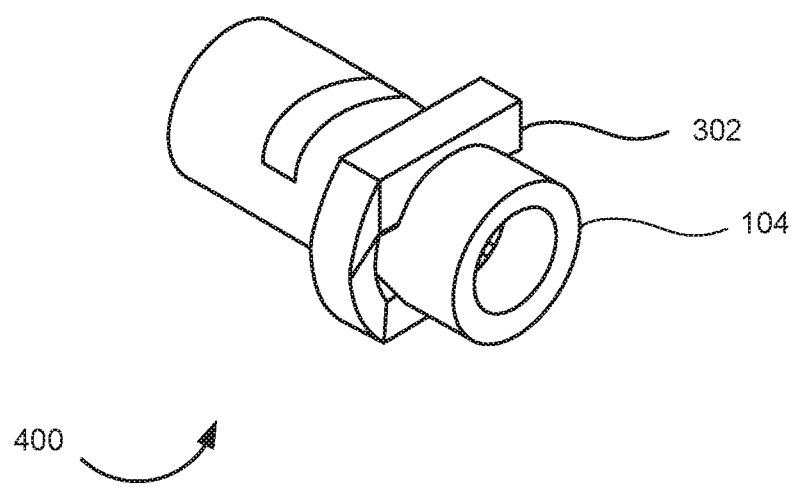
FIG. 4 is a perspective view of the clipping engaged with the gripping shaft of FIG. 2 according to an embodiment herein.

FIG. 4 is a perspective view 400 of the clipping ring engaged with the gripping shaft 104 of FIG. 2 according to an embodiment herein. The clipping ring 302 engages with the first channel 204 of the gripping shaft 104. In another embodiment, the clipping ring 302 may engage with the second channel 206.

Figure 5:
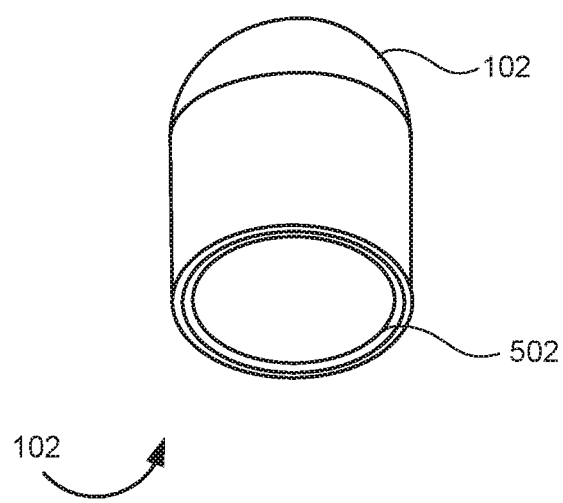
FIG. 5 is a diagrammatic representation of the cap of FIG. 1 according to an embodiment herein.

FIG. 5 is a diagrammatic representation of the cap 500 (102 of FIG. 1 according to an embodiment herein). The cap 102 includes a hole 502 at the bottom. The hole 502 is adapted to allow the gripping shaft 104 to enter the cap 102. In one embodiment, the cap is made of plastic. In another embodiment, the plastic may be acrylonitrile butadiene styrene.

A protection cap assembly hides and protects the bolts visible in various places. One or more fins increase the holding power of the gripping shaft over the bolts. Acrylonitrile butadiene styrene increases the durability of protection cap assembly. The gripping shaft is designed in order to accommodate bolts of different sizes. The protection cap assembly can be used for any size of bolt. The protection cap also telescopes on the gripping shaft allowing flexibility to engage the surface underneath. The expenses to cut the bolt are highly reduced by using the protection cap assembly. The protection cap assembly possesses high aesthetic value. The protection cap assembly is designed to be used in various places without limiting to toilets.

The foregoing description of the specific embodiments will so fully reveals the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A protection cap assembly for a bolt to protect said bolt, wherein said protection cap assembly comprises:
    a clipping ring;
    a gripping shaft that is adapted to hold said clipping ring, wherein said gripping shaft comprises:
        a big inlet;
        a small inlet;
        a pair of set screws that is adapted to engage with a bolt;
        a first channel that is adapted to hold said clipping ring;
        a second channel that is adapted to hold said clipping ring;
        a first set of one or more fins arranged inside said gripping shaft; and
        a second set of one or more fins arranged inside said gripping shaft; and
    a cap that is adapted to enclose said gripping shaft, wherein said cap comprises:
        a hole that is adapted to enclose said gripping shaft.

2. The protection cap assembly of claim 1, wherein said pair of set screws comprises two set screws.

3. The protection cap assembly of claim 1, wherein said gripping shaft comprises said big inlet to accommodate a big sized bolt.

4. The protection cap assembly of claim 1, wherein said gripping shaft comprises said small inlet to accommodate a small sized bolt.

5. The protection cap assembly of claim 1, wherein said gripping shaft is made from a material selected from a group of plastic or metal.

6. The protection cap assembly of claim 1, wherein said gripping shaft is made from acrylonitrile butadiene styrene.

7. The protection cap assembly of claim 1, wherein said clipping ring is made from a material selected from a group of plastic or metal.

8. The protection cap assembly of claim 1, wherein said clipping ring is made from acrylonitrile butadiene styrene.

9. The protection cap assembly of claim 1, wherein said cap is made from a material selected from a group of plastic or metal.

10. The protection cap assembly of claim 1, wherein said cap is made from acrylonitrile butadiene styrene.

11. The protection cap assembly of claim 1, wherein said cap is adapted to telescope on said gripping shaft.

12. A protection cap assembly for a bolt to protect said bolt, wherein said protection cap assembly comprises:
    a clipping ring;
    a gripping shaft that is adapted to hold said clipping ring, wherein said gripping shaft comprises:
        a big inlet to accommodate a big sized bolt and a small inlet to accommodate a small sized bolt, wherein said gripping shaft is made from plastic and further comprises:
            a pair of set screws that is adapted to engage with a bolt;
            a first channel that is adapted to hold said clipping ring;

a second channel that is adapted to hold said clipping ring;

a first set of one or more fins arranged inside said gripping shaft; and a second set of one or more fins arranged inside said gripping shaft; and a cap that is adapted to enclose said gripping shaft, wherein said cap is made from plastic or metal, wherein said cap comprises:

a hole that is adapted to enclose said gripping shaft.

13. The protection cap assembly of claim 12, wherein said clipping ring is made from acrylonitrile butadiene styrene.

14. The protection cap assembly of claim 12, wherein said cap is made from acrylonitrile butadiene styrene.

15. The protection cap assembly of claim 12, wherein said gripping shaft is made from acrylonitrile butadiene styrene.

\* \* \* \* \*